| United States Patent [19] | [11] Patent Number: 5,069,962 |
|---|---|
| Okazaki et al. | [45] Date of Patent: Dec. 3, 1991 |

[54] BIAXIALLY ORIENTED LAMINATED FILM

[75] Inventors: Iwao Okazaki; Koichi Abe, both of Kyoto; Shoji Nakajima, Otsu, all of Japan

[73] Assignee: Toray Industries, Inc., Japan

[21] Appl. No.: 363,506

[22] Filed: Jun. 8, 1989

[51] Int. Cl.$^5$ .................................................. B32B 5/16
[52] U.S. Cl. .................................... 428/323; 428/213; 428/402; 428/480; 428/483; 428/900; 428/910
[58] Field of Search .............. 428/483, 480, 402, 694, 428/900, 910, 213, 323

[56] References Cited

U.S. PATENT DOCUMENTS

| 3,873,018 | 3/1975 | Donnay | 428/343 |
|---|---|---|---|
| 4,125,190 | 11/1978 | Davie et al. | 206/532 |
| 4,241,864 | 12/1980 | Kessler | 229/5.5 |
| 4,506,789 | 3/1985 | Dlugosz | 206/532 |
| 4,589,145 | 5/1986 | van Erden et al. | 206/610 |
| 4,687,700 | 8/1987 | Hensel et al. | 428/900 |

FOREIGN PATENT DOCUMENTS

| 0035835 | 9/1981 | European Pat. Off. . | |
|---|---|---|---|
| 0158960 | 7/1988 | European Pat. Off. . | |
| 2207804 | 6/1974 | France . | |
| 2233165 | 1/1975 | France . | |
| 3212549 | 9/1988 | Japan | 428/483 |

*Primary Examiner*—Edith L. Buffalow
*Attorney, Agent, or Firm*—Austin R. Miller

[57] ABSTRACT

Disclosed is a biaxially oriented laminated film with excellent scratch resistance and friction property, as well as excellent dubbing resistance when used as a base film of magnetic recording media. The biaxially oriented laminated film comprises a first layer containing a first thermoplastic resin as a major constituent; and a second layer containing a second thermoplastic resin as a major constituent, which is formed on at least one surface of the first layer. The second layer contains inert particles with an average diameter of 0.1 to 10 times the thickness of the second layer, and the content of the inert particles in the second layer is 0.5-50% by weight. The thickness of the second layer is 0.005-3 μm.

18 Claims, No Drawings

BIAXIALLY ORIENTED LAMINATED FILM

BACKGROUND OF THE INVENTION

I. Field of the Invention

This invention relates to a biaxially oriented laminated film. More particularly, this invention relates to a biaxially oriented laminated film suitable as, for example, the base film of the magnetic recording media, which gives high quality image when used as the base film of the magnetic recording media and which has excellent scratch resistance.

II. Description of the Related Art

A biaxially oriented polyester film containing substantially spherical particles originating from colloidal silica is known and is described in, for example, Japanese Patent Disclosure (Kokai) No. 171623/84. A biaxially oriented laminated film suitable as a base film of magnetic recording media is also known and described in German Patent No. 3414347.5. However, these films have a drawback in that the surface of the film is likely to be scratched with a roll used in, for example, the printing step in the case of films for applications for packaging, or in the step of coating a magnetic solution or in the calendering step in the case of films used as the base film of magnetic recording media. Further, the above-described conventional biaxially oriented films have a drawback in that friction coefficient thereof is increased when the film is handled in an environment with high temperature and high humidity, so that the handling of the film is degraded.

Further, recently, the video tapes which are one of the major applications of the biaxially oriented polyester films are often used for replicating software. That is, video and movie products are copied on the video tapes (packaging medium) from a master tape. With the conventional video tapes, the reduction of the signal/noise ratio (S/N) is large when the dubbing of the video and movie products is carried out at a high speed, so that the image quality of the copied products is degraded. Thus, the dubbing resistance of the conventional video tapes is not satisfactory.

SUMMARY OF THE INVENTION

Accordingly, the object of the present invention is to provide a biaxially oriented film of which surface is hardly scratched, i.e., which excells in scratch resistance, which has a small friction coefficient even under high temperature and high humidity, i.e., which excelles in friction property, and with which the reduction of S/N caused by dubbing is small, i.e., which has an excellent dubbing resistance when the film is used as the base film of magnetic recording media.

The present invention provides a biaxially oriented laminated film comprising a first layer (hereinafter referred to as "layer B") containing a first thermoplastic resin (hereinafter referred to as "thermoplastic resin B") as a major constituent; and a second layer (hereinafter referred to as "layer A") containing a second thermoplastic resin (hereinafter referred to as "thermoplastic resin A") as a major constituent, which is formed on at least one surface of the layer B, the layer A containing inert particles with an average diameter of 0.1 to 10 times the thickness of the layer A, the content of the inert particles in the layer A being 0.5-50% by weight, the thickness of the layer A being 0.005-3 μm.

The biaxially oriented laminated film of the present invention has excellent scratch resistance, excellent friction coefficient and excellent dubbing resistance. Thus, the film of the present invention is hardly scratched by the roll employed in the printing process, magnetic solution-applying step or in the calendering step. The handling of the film of the present invention is not degraded even if it is used in an environment with high temperature and high humidity. Further, in cases where the film of the present invention is used as the base film of magnetic recording media, the reduction of S/N caused by dubbing is small. In other words, if the video and movie products are copied on a video tape containing the film of the present invention as the base film, the quality of the image of the products is not so degraded.

DESCRIPTION OF THE PREFERRED EMBODIMENTS

Examples of the thermoplastic resin A employed for forming layer A in the laminated film of the present invention may include, for example, polyesters, polyolefins, polyamides and polyphenylenesulfides. Among these, polyesters, especially the polyesters containing ethylene terephthalate, ethylene $\alpha$, $\beta$-bis(2-chlorophenoxy)ethane-4,4'-dicarboxylate and/or ethylene 2,6-naphthalate as the major constituent, are preferred because better scratch resistance, dubbing resistance and friction coefficient may be obtained.

The thermoplastic resin A employed in the film of the present invention may preferably be crystalline or melting anisotropic because better scratch resistance, dubbing resistance and friction property may be obtained. The term "crystalline" herein means that the polymer is not amorphous. In other words, from the quantitative point of view, the cooling crystallization point Tcc can be determined and a crystallization parameter $\Delta$ Tcg which is described later in detail is not higher than 150° C. Further, it is especially preferred that crystallinity of the thermoplastic resin A be such that the heat of fusion (fusion enthalpy change) is not less than 7.5 cal/g because better scratch resistance, dubbing resistance and friction property may be obtained. The thermoplastic resin A may be a mixture of two or more thermoplastic resins, and copolymers may be employed as the thermoplastic resin A.

In cases where the thermoplastic resin A is a polyester, the intrinsic viscosity of the film may preferably be not less than 0.60, more preferably not less than 0.70 because better scratch resistance may be obtained. Further, in cases where the thermoplastic resin A is a polyester, the content of low molecular weight components may preferably be not more than 0.8% by weight, more preferably not more than 0.5% by weight, because better scratch resistance may be obtained.

As mentioned above, the layer A contains inert particles. The inert particles have an average diameter (particle size) of 0.1-10 times, preferably 0.5-5 times, more preferably 1.1-3 times the thickness of layer A. If the ratio of the average particle size of the inert particles to the thickness of layer A is smaller than the above-mentioned range, the scratch resistance and the friction property are degraded. If the ratio is larger than the above-described range, the scratch resistance, dubbing resistance and the friction property are degraded.

The average particle size of the inert particles contained in layer A may preferably be 0.007-0.5 μm, more preferably 0.02-0.45 μm because better scratch resistance, dubbing resistance and friction property may be obtained.

The ratio of longer diameter of the inert particle in layer A to the shorter diameter thereof (hereinafter referred to as "particle size ratio") may preferably be 1.0 to 1.3 because the scratch resistance may be further improved by employing the particles with the particle size ratio of the above-mentioned range. It is especially preferred that the inert particles be substantially spherical.

The inert particles in layer A may preferably have a relative standard deviation (described later in detail) of not more than 0.6, more preferably not more than 0.5 because better scratch resistance and dubbing resistance may be obtained.

The inert particles in layer A may preferably has an index of a particle (described later in detail) of not less than 0.7, more preferably not less than 0.9 because better scratch resistance and dubbing resistance may be obtained.

The material for constituting the inert particles in layer A is not restricted as long as it is inert to the thermoplastic resin A or other components which may be incorporated in the layer A. The inert particles may preferably be substantially spherical silica particles originating from colloidal silica or may preferably be particles of a crosslinked polymer such as crosslinked polystyrene. Particles of aluminosilicate, agglomerated silica particles and non-incorporated particles are not preferred. The crosslinked polymer particles with a 10% weight reduction temperature (the temperature at which the weight of the particles is reduced by 10% by weight) measured with a thermogravimetric analyzer under a heating rate of 20° C./min. in nitrogen atmosphere of not lower than 380° C. are preferred because better scratch resistance and dubbing resistance may be obtained. In cases where the silica particles originating from colloidal silica are employed, it is preferred to use the substantially spherical particles prepared by the alkoxide method with low sodium content (i.e., not more than 0.5% by weight) because better scratch resistance and dubbing resistance may be obtained. It should be noted that other particles such as, for example, calcium carbonate, titanium dioxide and alumina may also be employed by controlling the average particle size with respect to the thickness of layer A as mentioned above.

Although not restricted, the crystallization promoting coefficient of the inert particles in layer A may preferably be $-15°$ to $15°$ C., more preferably $-5°$ to $10°$ C. because better scratch resistance may be obtained.

The content of the inert particles in layer A with respect to the total weight of layer A is 0.5–50% by weight, preferably 1–30% by weight, more preferably 2–15% by weight. If the content is outside the above-described range, the scratch resistance is degraded.

Although not restricted, the density ratio of layer below surface which is described later in detail at at least the surface of the layer A may preferably be not more than 1/10, more preferably not more than 1/50 because better friction property and scratch resistance may be obtained.

It is preferred that the depth (a) (nm) of the layer A from the surface thereof up to 3000 nm, at which the particle density is ten times that at the surface of the layer A, and the depth (b) (nm) at which the particle density is the same as that at the surface of the layer A satisfy the following relationships (i) and (ii) because better scratch resistance, dubbing resistance and friction property may be obtained.

$$10 \leq b - a \leq 1500 \quad (i)$$

$$\leq a \leq 500 \quad (ii)$$

The thickness of the layer A is 0.005–3 μm, preferably 0.01–1 μm, more preferably 0.03–0.5 μm. If the thickness of the layer A is smaller than the above-described range, the dubbing resistance and the friction property are degraded and if the thickness is larger than the above-described range, the scratch resistance is degraded.

In cases where the thermoplastic resin A is a crystalline polyester, it is preferred that the crystallization index of attenuated total reflection Raman later described in detail be not more than 20 cm$^{-1}$, more preferably not more than 18 cm$^{-1}$, still more preferably not more than 17 cm$^{-1}$ because better scratch resistance, dubbing resistance and friction property may be obtained.

In cases where the thermoplastic resin A is a polyester, the index of refraction of layer A in the direction of thickness thereof may preferably be not more than 1.5 because better scratch resistance and dubbing resistance may be obtained.

The above-described layer A containing the thermoplastic resin A as the major constituent and the inert particles is formed on at least one surface of layer B which contains thermoplastic resin B as the major constituent. Thus, the laminated film of the present invention may preferably have the multilayered structure of, for example, A/B, A/B/A or A/B/C (C is a layer containing as a major constituent a third thermoplastic resin (thermoplastic resin C), although the laminated film of the present invention may comprise additional layers.

The thermoplastic resins which may preferably be employed as the thermoplastic resin A may also preferably be employed as the thermoplastic resin B (or C). In the laminated film of the present invention, the thermoplastic resins A and B (and C) may be the same or different.

The layer B need not contain inert particles. However, it is preferred that layer B contain inert particles with an average particle size of 0.007–2 μm, more preferably 0.02–0.45 μm in the amount of 0.001–0.15% by weight, more preferably 0.005–0.05% by weight because not only the friction property and scratch resistance may be further improved, but also the roll formation of the film may be improved. In this case, the preferred materials for constituting the inert particles in layer A may preferably be employed for constituting the inert particles in layer B. The characteristics of the inert particles such as material and the particle size may be the same or different in layers A and B. The layer C, if any, may also contain inert particles. The material and particle size of the inert particles may be as described for the inert particles in layer A.

The difference between the crystallization parameter $\Delta T_{cg}$ of the thermoplastic resin A and that of the thermoplastic resin B (A - B) may preferably be $-30°$ C. to $+20°$ C. because the scratch resistance and dubbing resistance are especially good if the difference in $\Delta T_{cg}$ of the thermoplastic resins A and B is in the above-mentioned range.

Although not restricted, the thickness of layer B may usually be 1 to 200 μm, preferably 3 to 100 μm, more preferably 5 to 25 μm.

The layers A and B (and C) may contain other polymers and/or additives normally added to the thermoplastic resin films, such as antioxidants, heat stabilizers, lubricants and UV absorbers in the amount not adversely affecting the advantageous effect of the present invention.

The laminated film of the present invention must be biaxially oriented. If the laminated film is uniaxially oriented or non-oriented, the scratch resistance is not good. Although the degree of orientation is not limited, it is preferred that the Young'as modulus which is an index indicating the degree of orientation of high polymers be not less than 350 kg/mm² in both the longitudinal and transverse directions because the better scratch resistance may be obtained in this case. Although the Young's modulus may be as large as possible, it is difficult to manufacture a film with a Young's modulus of not less than about 1500 kg/mm².

Even when the Young's modulus of the entire film is in the range described above, it is preferred that entire laminated film is biaxially oriented because better scratch resistance, dubbing resistance and friction property may be obtained. That is, it is preferred that the laminated film do not have any portion which is uniaxially oriented or non-oriented. In particular, when examined with an Abbe's refractomer, refractometer employing laser beam, or by attenuated total reflection Raman method, it is preferred that the both sides of the laminated film be biaxially oriented because better scratch resistance, dubbing resistance and friction property may be obtained.

Although the thermoplastic resins constituting the laminated film of the present invention are preferably crystalline or melting isotropic, in cases where the laminated film is melting anisotropic, it is preferred that a parameter of crystallization $\Delta Tcg$ be 25°-65° C. in view of the scratch resistance and friction property.

In view of the scratch resistance, dubbing resistance and friction property, it is preferred that the content $\Phi$ of the inert particles in the laminated film in terms of % by weight of the laminated film, the average diameter D(nm) of the inert particles, and the density of the total protrusions N (protrusions/mm²) of at least one surface of the laminated film satisfy the following relationship (iii):

$$N/(\Phi/D^3) \geq 5 \times 10^{13} \tag{iii}$$

Since layer A contains substantial amount of inert particles, protrusions are formed on the surface of layer A due to the inert particles. The average height of the protrusions on the surface of at least layer A may preferably be 5-500 nm, more preferably 10-300 nm, still more preferably 15-200 nm because better scratch resistance, dubbing resistance and friction property may be obtained.

The average interval between adjacent protrusions on the surface of at least layer A may preferably be not more than 6 μm, more preferably not more than 4 μm in view of the scratch resistance, dubbing resistance and friction property.

In view of the scratch resistance, dubbing resistance and friction property, the average height of protrusions on the surface of at least layer A may preferably be not less than ⅓ of the average particle size of the inert particles in the layer A.

In view of the scratch resistance, dubbing resistance and friction property, it is preferred that the number of protrusions on the surface of the layer A having the height of not more than ⅓ of the average particle size in the layer A may preferably be not more than 40% of the total number of the protrusions on the surface of the layer A.

In view of the scratch resistance, dubbing resistance and friction property, it is preferred that at least one surface of the laminated film have a surface roughness parameter Rt/Ra of not more than 8.0, more preferably not more than 7.5, wherein Rt means the maximum roughness and Ra means center line average roughness.

In view of the scratch resistance, dubbing resistance and friction property, a parameter of surface roughness Rz/Rt (Rz means average roughness of 10 points) may preferably be not less than 0.85, and an interval between adjacent protrusions Sm of not more than 6.0 um.

The center line depth Rp of at least one surface of the laminated film of the present invention may preferably be not more than 180 nm, more preferably not more than 160 nm because better dubbing resistance may be obtained. A parameter of surface roughness Rt/Rp of at least one surface of the laminated film of the present invention may preferably be 1.5-2.5, more preferably 1.7-2.3 because better scratch resistance, dubbing resistance and friction property may be obtained.

In view of the scratch resistance, dubbing resistance and friction property, a parameter of surface roughness $\sigma/H$ which is later described in detail may preferably be not more than 0.8.

A preferred process of manufacturing the biaxially oriented laminated film of the present invention will now be described. It should be noted, however, the manufacturing process of the biaxially oriented laminated film of the present invention is not restricted to the process hereinafter described.

The inert particles to be incorporated in layer A are dispersed in thermoplastic resin A. In cases where the thermoplastic resin A is a polyester, this may be advantageously accomplished by dispersing the inert particles in the glycol component such as ethylene glycol in the form of slurry before the polycondensation with an acid component. This method is effective for attaining the relationship between the thickness of layer A and average particle size of the inert particles, and the content of the inert particles required in the present invention, as well as the desired orientation of the film. It is preferable to set the crystallization parameter $\Delta Tcg$ of the polyester to 40°-65° C. by controlling the melt viscosity of the polyester or by selecting the copolymerization component, for attaining the relationship between the thickness of layer A and average particle size of the inert particles, and the content of the inert particles required in the present invention, as well as the desired orientation of the film.

In cases where the thermoplastic resin is a polyester and ethylene glycol is employed as the diol component, it is preferable for attaining the relationship between the thickness of layer A and average particle size of the inert particles, and the content of the inert particles required in the present invention, as well as the desired orientation of the film and the desired density ratio of layer, to heat the ethylene glycol slurry at 140°-200° C., preferably 180°-200° C. for 30 minutes to 5 hours, preferably 1-3 hours.

The inert particles may be incorporated in the thermoplastic resin A by mixing an aqueous slurry of the inert particles with the thermoplastic resin A with a vented twin-screw extruder. The aqueous slurry with the inert particles is prepared by heating the particles in ethylene glycol at 140°-200° C., preferably 180°-200° C. for 30 minutes to 5 hours, preferably 1-3 hours and by exchanging the solvent with water. This method is also preferred for attaining the relationship between the thickness of layer A and average particle size of the inert particles, and the content of the inert particles required in the present invention, as well as the desired orientation of the film, the desired density ratio of layer and the desired average height of protrusions.

It is convenient to control the content of the inert particles by diluting a master polymer containing high content of the particles prepared by the above-described method with a thermoplastic resin which does not substantially contain the inert particles at the time of film formation.

After drying, if necessary, the thus formed thermoplastic resin composition typically in the form of pellets, the thermoplastic resin pellets are supplied to a conventional extruder. The thermoplastic resin is melt-extruded through a die in the form of a slit according to the conventional method at a temperature higher than the melting point of the themoplastic resin and lower than the decomposition point of the resin, and the extuded resin melt is cooled and solidified on a casting roll to form a non-oriented laminated film (the method of lamination is hereinbelow described). In this case, it is preferable for attaining the relationship between the thickness of layer A and average particle size of the inert particles, and the content of the inert particles required in the present invention, as well as the desired orientation of the film, the desired density ratio of layer and the desired crystallization index of attenuated total reflection Raman, to select the ratio of the clearance of the slit of the die to the thickness of the non-oriented film of 5-30, preferably 8-20.

The lamination may advantageously be accomplished by the following method:

The thermoplastic resins A and B are separately supplied to separate extruders. Each of the thermoplastic resins are separately extruded and after the extrusion and before the solidification on the casting drum, the extruded thermoplastic resin sheets are laminated by using a multilayered manifold (the number of the layers of the manifold corresponds to the number of the layers in the laminated film to be prepared) or a confluency block. The laminated sheet is cooled and solidified to obtain a laminated non-oriented film. In this case, it is preferable to provide a static mixer or a gear pump on the moving path of the thermoplastic resin A for attaing the relationship between the thickness of layer A and average particle size of the inert particles, and the content of the inert particles required in the present invention, as well as the desired orientation of the film, the desired density ratio of layer and the desired average height of protrusions. It is also preferable to select the melting temperature of the thermoplastic resin A, which is higher than that of the thermoplastic resin B by 10°-40° C. for attaining the relationship between the thickness of layer A and average particle size of the inert particles, and the content of the inert particles required in the present invention, as well as the desired orientation of the film, the desired density ratio of layer, the desired average height of protrusions and the desired crystallization index of attenuated total reflection Raman.

The thus prepared non-oriented laminated film is then biaxially stretched so as to biaxially orienting the polymer. The biaxial stretching may be carried out successively or simultaneously. It is preferable to first conduct the stretching in the longitudinal direction in not less than three steps at a total stretching ratio of 3.0-6.5 times the original length for attaining the relationship between the thickness of layer A and average particle size of the inert particles, and the content of the inert particles required in the present invention, as well as the desired orientation of the film and the desired density ratio of layer. It should be noted, however, in cases where the thermoplastic resin is a melting anisotropic resin, the stretching ratio in the longitudinal direction may preferably be 1.0-1.1 times the original length. Although the temperature in the longitudinal stretching varies depending on the thermoplastic resin, it is preferable to select a temperature of 50°-130° C. in the first stretching step and, in the subsequent stretching steps, to select a stretching temperature higher than the stretching temperature in the first stretching step, for attaining the relationship between the thickness of layer A and average particle size of the inert particles, and the content of the inert particles required in the present invention, as well as the desired orientation of the film, the desired density ratio of layer and the desired average height of protrusions. In this case, the stretching temperature is selected based on the thermoplastic resin B. The stretching rate in the longitudinal direction may preferably be 5000 to 50,000%/min. The stretching in the transverse direction is usually conducted by using a stenter. The stretching ratio may preferably be 3.0 to 5.0 times the original length, the stretching rate may preferably be 1000-20,000%/min, and the stretching temperature may preferably be 80°-160° C.

The thus prepared biaxially stretched laminated film is then heat set. The temperature of the heat set may preferably be 170°-200° C., more preferably 170°-190° C., and the time of the heat set may preferably be 0.5-60 seconds. It is preferable to select the temperature of the hot wind blown to the layer A lower than that of the hot wind blown to the layer B by 3°-20° C., for attaining the relationship between the thickness of layer A and average particle size of the inert particles, and the content of the inert particles required in the present invention, as well as the desired orientation of the film, the desired density ratio of layer, the desired average height of protrusions and the desired crystallization index of attenuated total reflection Raman.

The biaxially oriented laminated film of the present invention may be in the form of a roll. In this case, the thickness fluctuation across the width of the roll may preferably be not more than 50% and the tightness of winding may preferably be 81-97 because the good dubbing resistance may be obtained.

The biaxially oriented laminated film of the present invention may advantageously be used as a base film of magnetic recording media. Thus, conventional magnetic solution for forming the magnetic layer can be applied to the laminated film of the present invention so as to provide a magnetic recording medium. In cases where the laminated film has a structure of A/B, the magnetic layer is formed on layer B.

The biaxially oriented laminated film of the present invention may also be used as a base film of thermal transfer materials. Thus, the conventional thermal transfer layer can be formed on the laminated film of the present invention so as to provide a thermal transfer material. In cases where the laminated film has a structure of A/B, the thermal transfer layer is formed on layer B.

The laminated film of the present invention can find a number of other uses such as films for applications for packaging.

The method of determining the characteristics concerning the present invention and the method of evaluating the effects of the present invention will now be described.

(1) Average Particle Size of Inert Particles

Polyester is removed from the film by the plasma low temperature ashing treatment to expose the particles. The conditions of the ashing treatment are selected so that the particles are not damaged whereas the polyester is ashed. The resulting exposed particles are observed with scanning electron microscope (SEM) and the image of the particles is processed with an image analyzer. Changing the portion to be observed, not less than 5000 particles are processed according to the following data processing equation and the obtained number average diameter D is defined as the average particle size of the particles:

$$D = \Sigma Di/N$$

wherein $Di$ represents the circle-corresponding diameter, $N$ represents the number of the particles.

(2) Particle Size Ratio

The particle size ratio is the ratio of (average longer diameter)/(average shorter diameter) of each particle, which is obtained in (1). That is, the average longer diameter and the average shorter diameter of a particle are obtained by the following equations, respectively:

$$\text{Average Longer Diameter} = \Sigma D1/N$$

$$\text{Average Shorter Diameter} = \Sigma D2/N$$

wherein $D1$ and $D2$ represent the longer diameter (maximum diameter) and the shorter diameter (mininum diameter) of a particle, respectively, and $N$ represents the number of particles.

(3) Relative Standard Deviation of Particle Size

The relative standard deviation of particle size is defined as $(\sigma/D)$ wherein $\sigma$ represents the standard deviation defined by the following equation:

$$\sigma = \sqrt{\{\Sigma(Di-D)^2/N\}}$$

wherein $Di$, $D$ and $N$ represent the same meaning as in (1).

(4) Index of a Particle

Photographs of cross sections of the film taken with a transmission electron microscope (TEM) are observed so as to detect the particles. By setting the magnification of the microscope at about 100,000 magnifications, single particles which cannot be separated any more can be observed. The index of a particle is defined as $(A-B)/A$ wherein A represents the total area of the cross sections of the particles and B represents the area of the cross sections of agglomerates of particles in which not less than two particles are aggregated. The conditions of operating the TEM are as follows:

Magnification: 100,000 Times
Acceleration Voltage: 100 kV
Thickness of Observed Section: about 100 nm The area of one visual field is 2 $\mu m^2$ and 500 different visual fields are observed.

(5) Content of Inert Particles

The film is treated with a solvent which dissolves the polyester but which does not dissolve the particles. The resultant is centrifuged to separate the particles. The content of the particles is defined as the ratio of the weight of the separated particles to the total weight of the film. In some cases, infrared spectrophotometry may effectively be co-employed.

6) Crystallization Parameter $\Delta Tcg$, Heat of Fusion

The crystallization parameter $\Delta Tcg$ and the heat of fusion of the film are measured by differential scanning calorimetry (DSC). The DSC is carried out as follows:

Ten milligrams of a sample is placed in a DSC apparatus and the sample is fused at 300° C. for 5 minutes, followed by being rapidly cooled in nitrogen atmosphere. The rapidly cooled sample is then heated at a rate of 10° C./min. to find the glass transition point $Tg$. The heating of the sample is still continued and the crystallization exothermic temperature from the glass state is determined. The crystallization exothermic temperature is defined as the cooling crystallization point $Tcc$. The heating of the sample is still continued and the heat of fusion is determined from the peak of fusion. The difference between $Tg$ and $Tcc$ ($Tcc - Tg$) is defined as the crystallization parameter $\Delta Tcg$.

(7) Crystallization Promoting Coefficient

In accordance with the method described in (6), the $Tcg(I)$ of the polyester containing 1% by weight of particles, and $\Delta Tcg(II)$ of the polyester with the same viscosity from which the particles are removed are determined. The crystallization promoting coefficient is defined as the difference between $\Delta Tcg(II)$ and $\Delta Tcg(I)$ [$\Delta Tcg(II) - \Delta Tcg(I)$]. (8) Young's Modulus The Young's modulus is determined in accordance with JIS-Z-1702 using an Instron tensile tester at 25° C., 65% RH.

(9) Degree of Molecular Orientation of Surface (Refractive Index)

The degree of molecular orientation of the surface of the film (refractive index) is determined using an Abbe's refractometer using sodium D line (589 nm) as a light source. Methylene iodide is used as the mounting solution and the measurement is conducted at 25° C., 65% RH. One of the criteria of the biaxial orientation of a polymer is that the absolute value of $(N_1 - N_2)$ is not more than 0.07 and $N_3/[(N_1 + N_2/2]$ is not more than 0.95, wherein $N_1$, $N_2$ and $N_3$ represent the refractive index of the film in the longitudinal direction, transverse direction and in the direction of thickness, respectively. The refractive indices may also be determined with a laser type refractometer. In cases where the measurement of the refractive indices is difficult by these methods, the attenuated total reflection Raman method may be employed for determining the degree of the molecular orientation of the surface of the film. In this method, attenuated total reflection Raman spectrum is measured and the degree of the molecular orientation is determined based on the fact that, in the case of polyethylene terephthalate (hereinafter referred to as "PET" for short), for example, the polarizing ratio (such as YY/XX ratio wherein YY means the Raman beam detected in the direction parallel to Y wherein the polarization direction of the impinging laser beam is Y, and XX means the Raman beam detected in the direction parallel to X wherein the polarization direction of the impinging laser beam is X) of the ratio of the band intensity at 1615 cm$^{-1}$ (frame vibration of benzene ring) and at 1730 cm$^{-1}$ (stretching vibration of carbonyl group) corresponds to the degree of molecular orientation. The degree of biaxial orientation of the polar may be determined by converting the parameters obtained by the measurement of the Raman spectrum into the refractive indices in the longitudinal and transverse directions, and by employing the above-described criteria. The conditions for determining the Raman beam are as follows:

a) Light Source
  Argon Ion Laser (514.5 nm)
b) Setting of Sample
  The surface of the sample film is pressingly contacted with a totally reflecting prism and the impinging angle of the laser beam to the prism (the angle between the impinging laser beam and the direction of thickness of the film) is 60°.
c) Detector
  PM:RCA31034/Photon Counting system (Hamamatsu C1230) (supply 1600 V), commercially available from Hamamatsu Photonics, Hamamatsu, Japan
d) Measuring Conditions
  Slit: 100 μm
  Laser: 100 mW
  Gate Time: 1.0 sec.
  Scanning Speed: 12 cm$^{-1}$/min.
  Sampling Interval: 0.2 cm$^{-1}$
  Repeat Time: 6

(10) Crystallization Index of Attenuated Total Reflection Raman

The attenuated total reflection Raman spectrum was measured and the crystallization index of attenuated total reflection Raman is defined as the half value of the width of the stretching vibration of carbonyl group at 1730 cm$^{-1}$. The measurement conditions are the same as (9). The portions subjected to the measurement have a depth of 50–100 nm from the surface of the film.

(11) Intrinsic Viscosity [η] (in terms of dl/g)

The sample film is dissolved in o-chlorophenol and the viscosity of the solution is measured at 25° C. The intrinsic viscosity is defined by the following equation:

$$\xi_{SP}/C = [\eta] + K[\eta]^2 C$$

wherein $\eta_{SP}$ = (solution viscosity)/(solvent viscosity) − 1, C represents the weight of the dissolved polymer per 100 ml of solvent, K represents Huggins' constant (0.343). The solution viscosity and the solvent viscosity are measured with an Ostwald's viscometer.

(12) Content of Low Molecular Weight Components

The sample polymer is pulverized and the pulverized sample polymer is extracted with chloroform for 24 hours using a Soxhlet's extractor under reflux. The ratio of the weight of the residue of the extract after evaporation of solution to the weight of the original sample is defined as the content of the low molecular weight component.

(13) Particle Density at Surface Layer and Density Ratio of Layer

Using secondary ion mass spectrum (SIMS), the ratio of the density of the element with the maximum density among the elements originating from the particles in the film to the density of the carbon in the thermoplastic resin, which ratio is defined as particle density, is determined at various points along the direction of thickness of the film. The ratio A/B of the particle density A at the outermost surface (at a depth of 0) measured by SIMS (defined as the particle density at surface) to the maximum particle density B obtained by analyzing the sample film in the direction of thickness thereof is defined as the density ratio of layer. The measuring apparatus and the measuring conditions are as follows:
  Primary Ion Species: $O_2+$
  Primary Ion Acceleration Voltage: 12 kV
  Primary Ionic Current: 200 mA
  Luster Region: 400 μm
  Analyzed Region: Gate 30%
  Measuring Vacuum: $6.0 \times 10^{-9}$ Torr
  E-GUN: 0.5 kV − 3.0 A

(14) Average Height of Projections on Surface, Number of the Same and Average Interval Between Adjacent Projections on Surface The height of protrusions measured with a double-detection type scanning electron microscope by scanning the surface of the film setting the planar portion of the surface as the base (height 0) is transferred to an image processor and an image of surface protrusions is reconstructed on the display of the image processor. Then the height of each protrusion, which is defined as the highest value of the portions of the protrusion, is determined. The measurement is repeated 500 times changing the area to be observed, and the average height thereof is defined as the average height of protrusions. The magnification of the scanning electron microscope is 1000 to 8000 times. The average interval between adjacent protrusions is calculated from the number of protrusions. In some cases, the height obtained by using a high precision light interference type three dimensional surface analyzer (e.g., TOPO-3D commercially available from WYKO Co, Ltd.; objective lens: 40–200 magnifications) may be employed in place of the height measured by using the scanning electron microscope.

(15) Parameters of Surface Roughness Ra (center line average roughness), Rt (maximum height), Rz (average surface roughness of 10 points), Sm (interval between adjacent protrusions) and Rp (center line depth)

The parameters of surface roughness are determined by using a surface roughness meter. The conditions of measurement are as follows and the average of 20 times of measurement is employed.
  Radius of Tip of Touching stylus: 0.5 μm
  Load of Touching Stylus: 5 mg
  Length of Measured Portion: 1 mm
  Cut Off Value: 0.08 mm

(16) Parameters of Surface Roughness σ, H

The direction of the center line of the film surface roughness curve is taken as x-axis and the direction of height perpendicular to the center line is taken as y-axis and the difference ($y_{i2}-y_{i1}$) between the minimum value $y_{i1}$ and the nearest maximum value $y_{i2}$ is defined as the height $H_i$ of the protrusion. It should be noted, however, the height $H_i$ is not less than 3 nm. The parameters of surface roughness $\sigma$ and H are defined by the following equations including the $H_i$.

$$H = \sum_{i=1}^{N} H_i/N$$

$$\sigma = \sqrt{\left\{\sum_{i=1}^{N} (H_i - H)^2/N\right\}}$$

(17) Scratching Resistance

The sample film was slitted into a tape with a width of ½ inch and the tape is made to run on a guide pin with a surface roughness Ra of 100 nm using a tape running tester (running speed: 1000 m/min, number of running: 10 passes, winding angle: 60°, running inside tension: 65 g). After the run, the surface of the film was observed with a microscope and the number of scratches was counted. If the number of the scratches per the width of the tape, which scratches have a width of not smaller than 2.5 μm is less than 2, the scratching resistance of the film is evaluated to be excellent, if the number of the scratches is not less than 2 and less than 10, the scratching resistance of the film is evaluated to be good, and the number of scratches is not less than 10, the scratching resistance of the film is evaluated to be not good. Although the tapes with the scratching resistance of rank "excellent" are desired, the tapes with the scratching resistance of rank "good" are practically usable.

(18) Dubbing Resistance

A magnetic coating solution with the following composition was coated with a gravure roll on the surface of the film and the coated magnetic layer was magnetically oriented, followed by being dried. After calendering the resulting coated film with a small test calender (steel roll/nylon roll, 5 steps) at 70° C. for 48 hours. The thus obtained raw tape was slitted into a width of ½ inch to prepare a pan cake. A length of 250 m was cut off from the pan cake and was mounted on a tape cassette to prepare a VTR cassette tape.
[Composition of Coating Solution] (all parts are by weight)
 Co-containing Iron Oxide: 100 parts
 Vinyl Chloride/Vinyl Acetate Copolymer: 10 parts
 Polyurethane Elastomer: 10 parts
 Polyisocyanate: 5 parts
 Lecitin: 1 part
 Methylethyl Ketone: 75 parts
 Methylisobutyl Ketone: 75 parts
 Toluene: 75 parts
 Carbon Black: 2 part
 Lauric Acid: 1.5 part
On this tape, 100% chromatic signal generated by a television testing wave generator was recorded using a domestic video tape recorder, and chromatic S/N (A) was measured for the regenerated signal with a color video noise measuring apparatus. On the other hand, the same signal was recorded on the pan cake of the same tape (non-recorded) by dubbing of the same signal by using a video soft high speed printing system of the magnetic field transcription type and the chromatic S/N (B) was measured as mentioned above. If the reduction of chromatic S/N (A=B) which is caused by the dubbing is less than 3 dB, the dubbing resistance of the tape is evaluated to be excellent, if it is not less than 3 dB and less than 5 dB, the dubbing resistance of the tape is evaluated to be good, and if it is not less than 5 dB, the dubbing resistance of the tape is evaluated to be not good.

(19) Friction Coefficient: μK

The sample film is slitted to prepare a tape with a width of ½ inch. The tape is set in a tape running tester and is made to run at 60° C., 80% RH. The initial friction coefficient is determined according to the following equation:

$$\mu k = (1/\pi)\ln(T_2/T_1)$$

wherein $T_1$ represents the tension of the tape at the entering side and $T_2$ represents the tension of the tape at the exiting side. The conditions of the running test are as follows:
 Diameter of Guide Pin: 6 mm
 Material of Guide Pin: SUS 27 (with a surface roughness of 0.2 S)
 Winding Angle: 180°
 Running Speed: 3.3 cm/sec.
If the friction coefficient obtained by this measurement is not more than 0.30, the film is evaluated to have a good friction coefficient and if it is more than 0.30, the film is evaluated to have a not good friction coefficient. The μk of 0.30 is the maximum friction coefficient for obtaining the handling properties required in the processing of the film for preparing magnetic recording media, capacitor or a film for applications for packaging.

(20) Tightness of Winding of Film Roll

The hardness of film roll is measured by pressing a hardness tester (type C) commercially available from Kobunshi Keiki Co., Ltd.) to the outer surface of the roll. Five points along a line parallel to the axis of the roll are measured and three lines shifted each other by 120° along the periphery of the roll are selected. That is, totally 15 points are tested. The measured five points along the line are the center points of each section of the roll, which section is defined by equally dividing the roll after eliminating the both edge portions with a width of 10 mm. The average of the measured values is defined as the tightness of winding of the film roll.

The present invention will now be described in more detail by way of examples thereof. It should be noted, however, the examples are presented for illustration purpose only and should not be interpreted in any restrictive way.

EXAMPLES 1-10

COMPARATIVE EXAMPLES 1-7

An ethylene glycol slurry containing crosslinked polystyrene particles or silica particles originating from colloidal silica, which have varied particle size was prepared. The ethylene glycol slurry was heated at 190° C. for 1.5 hours. In accordance with the conventional method, after the resulting slurry was subjected to an ester exchange reaction with dimethyl terephthalate, the slurry was polymerized to prepare PET pellets containing 0.3-55% by weight of the particles. In Example 9, polyethylene α, β -bis(2-chlorophenoxy)ethane-4',4'-dicarboxylate, and in Example 10, polyethylene 2,6-naphthalate was employed in place of PET. The intrinsic viscosity of the polyester (thermoplastic resin A) was adjusted to 0.70 by controlling the polymerization time. On the other hand, by a conventional process, PET with an intrinsic viscosity of 0.62, which does not substantially contain inert particles was prepared (thermoplastic resin B). Each of these polymers was dried under reduced pressure (3 Torr) at 180° C. for 3 hours. The thermoplastic resin A was supplied to an extruder 1 and was melted at 310° C. The thermoplastic resin B was supplied to an extruder 2 and was melted at 280° C. The melted thermoplastic resins A and B were laminated by using a confluence block (feed block). The laminated polymer melt was wound about a casting drum with a surface temperature of 30° C. by the static casting method to obtain a two-layered non-oriented film. The ratio of the clearance of the slit of the die to the thickness of the non-oriented film was 10. By controlling the output of the extrusion, the overall thickness of the laminated film and the thickness of the thermoplastic resin layer A were controlled. The non-oriented film was stretched in the longitudinal directin with a stretching ratio of 4.5 times the original length at 80° C. This stretching was conducted in four steps employing two pairs of rolls with different circumference velocities. The thus obtained uniaxially oriented film was stretched in a stenter in the transverse direction with a stretching ratio of 4.0 times the original length at a stretching rate of 2000%/min. at 100° C. The resulting film was heat-set at 200° C. for 5 seconds at a constant length to obtain a biaxially oriented laminated film with an overall thickness of 15 um and with a thickness of the thermoplastic resin layer A of 0.003–5 $\mu$m. The parameters of the thus obtained films were determined as described above and are summuerized in Table 1 below. As can be seen from Table 1, the films of the present invention have excellent or good scratching resistance, dubbing resistance and friction coefficient, while with the films of the comparative examples, at least one of the three characteristics were not good.

TABLE 1

| | Content of Particles in Layer A (wt %) | Thickness of Layer ($\mu$m) | Ratio of Average Particle Size/Thickness of Layer A | Particle Size Ratio | Rt/Ra |
|---|---|---|---|---|---|
| Example 1 | 6 | 0.3 | 1 | 1.05 | 7 |
| Example 2 | 5 | 0.2 | 0.75 | 1.02 | 7 |
| Example 3 | 30 | 0.4 | 1.1 | 1.1 | 8 |
| Example 4 | 35 | 0.8 | 1 | 1.05 | 7 |
| Example 5 | 6 | 0.6 | 0.5 | 1.05 | 6 |
| Example 6 | 6 | 0.1 | 3 | 1.05 | 8 |
| Example 7 | 6 | 0.01 | 3 | 1.05 | 7 |
| Example 8 | 25 | 0.2 | 5 | 1.05 | 8 |
| Example 9 | 15 | 0.1 | 2 | 1.03 | 7 |
| Example 10 | 15 | 0.1 | 2 | 1.03 | 7 |
| Comparative Example 1 | 10 | 5 | 0.1 | 1.05 | 5 |
| Comparative Example 2 | 6 | 2.5 | 0.06 | 1.05 | 9 |
| Comparative Example 3 | 0.4 | 0.3 | 1 | 1.03 | 9 |
| Comparative Example 4 | 55 | 0.3 | 1 | 1.03 | 9 |
| Comparative Example 5 | 6 | 0.003 | 3.3 | 1.03 | 9 |
| Comparative Example 6 | 6 | 0.02 | 15 | 1.03 | 9 |
| Comparative Example 7 | 4.5 | 15 | 0.01 | 1.03 | 11 |

| | Ratio of Height of Protrusions on Surface of Layer A/ Average Particle Size | Percentage of Protrusions on Surface of Layer A with Height of not more than ⅓ of Particle Size | Friction Coefficient ($\mu$k) | Scratch Resistance | Dubbing Resistance |
|---|---|---|---|---|---|
| Example 1 | 0.45 | 20 | good 0.27 | excellent (1) | excellent (2.0 dB) |
| Example 2 | 0.45 | 25 | good 0.29 | excellent (1) | excellent (2.5 dB) |
| Example 3 | 0.4 | 20 | good 0.25 | excellent (1) | excellent (1.5 dB) |
| Example 4 | 0.45 | 25 | good 0.24 | excellent (1) | excellent (2.5 dB) |
| Example 5 | 0.4 | 20 | good 0.27 | excellent (1) | excellent (2.8 dB) |
| Example 6 | 0.4 | 20 | good 0.25 | excellent (1) | excellent (1.0 dB) |
| Example 7 | 0.35 | 25 | good 0.25 | excellent (1) | good (4.2 dB) |
| Example 8 | 0.4 | 30 | good 0.20 | good (5) | good (4.0 dB) |
| Example 9 | 0.35 | 35 | good 0.26 | good (2) | excellent (2.0 dB) |
| Example 10 | 0.35 | 35 | good 0.26 | good (3) | excellent (2.0 dB) |
| Comparative Example 1 | 0.25 | 60 | good 0.24 | not good (20) | excellent (2.8 dB) |
| Comparative Example 2 | 0.2 | 50 | not good 0.38 | not good (17) | excellent (2.8 dB) |
| Comparative Example 3 | 0.15 | 60 | not good 0.4 | not good (17) | excellent (2.8 dB) |
| Comparative Example 4 | 0.2 | 50 | good 0.27 | not good (25) | not good (10 dB) |
| Comparative Example 5 | 0.15 | 50 | not good 0.37 | good (4) | not good (11 dB) |
| Comparative Example 6 | 0.15 | 70 | not good 0.40 | not good (16) | not good (10 dB) |
| Comparative | 0.2 | 90 | not good 0.36 | not good (20) | not good (12 dB) |

EXAMPLES 11-14

The thermoplastic resin A employed in Example 1 was supplied to the extruder 1, and a PET with an intrinsic viscosity of 0.6, which contained crosslinked polystyrene particles with an average particle size of 0.3-1.0 μm (thermoplastic resin B) was supplied to the extruder 2. In the same manner as in Example 1, a three-layered film (A/B/A) with an overall thickness of 15 μm and a thickness of one of the thermoplastic resin layer A of 0.06-0.3 μm was prepared. The parameters of these films were determined as described above, which are shown in Table 2 below. The parameters of these films are in the scope of the present invention, so that all of the scratching resistance, dubbing resistance and friction coefficient were excellent or good.

merized according to the conventional method to prepare PET pellets containing prescribed amount of silica particles originating from colloidal silica. The intrinsic viscosity of the slurry was adjusted to 0.7 by controlling the polymerization time. In Example 18 and Comparative Example 9, a melting anisotropic polyester (LCP100E commercially available from Idemitsu Petrochemicals Co., Ltd.), which is a copolymer of PET and methyl p-oxybenzoate, and an aqueous slurry obtained by heating an ethylene glycol slurry containing silica particles originating from colloidal silica heated at 190° C. for 1.5 hours and then substituting the solvent with water were mixed with a vented twin-screw extruder to prepare a polymer pellets containing prescribed amount of silica particles originating from colloidal silica. Each of the pelletes was dried under re-

TABLE 2

|  | Content of Particles in Layer A (wt %) | Thickness of Layer (μm) | Ratio of Average Particle Size/ Thickness of Layer A | Particles in Layer B | |
|---|---|---|---|---|---|
|  |  |  |  | Average Particle Size (μm) | Content (wt %) |
| Example 11 | 6 | 0.3 | 1 | 1.0 | 0.03 |
| Example 12 | 12 | 0.15 | 2 | 0.3 | 0.05 |
| Example 13 | 18 | 0.1 | 3 | 0.3 | 0.015 |
| Example 14 | 30 | 0.06 | 5 | 0.3 | 0.008 |

|  | Particle Density | | Friction Coefficient (μk) | Scratch Resistance | Dubbing Resistance |
|---|---|---|---|---|---|
|  | a (nm) | b-a (nm) |  |  |  |
| Example 11 | 100 | 1000 | good 0.22 | excellent (0) | excellent (2.0 dB) |
| Example 12 | 100 | 400 | good 0.24 | excellent (0) | excellent (2.0 dB) |
| Example 13 | 100 | 400 | good 0.24 | excellent (0) | excellent (2.0 dB) |
| Example 14 | 100 | 400 | good 0.25 | good (3) | good (4.0 dB) |

EXAMPLES 15-18

COMPARATIVE EXAMPLES 8-15

An ethylene glycol slurry containing silica particles originating from silica particles with different average diameters was prepared. The sodium content of the slurry was adjusted to 0.02-1.5% by weight with respect to the particles. The ethylene glycol slurry was heated at 190° C. for 1.5 hours. The resulting slurry was then subjected to an ester exchange reaction with dimethyl terephthalate and then the resultant was polyduced pressure (3 Torr) at 180° C. for 3 hours, and was supplied to an extruder. The pellets were processed as in Example 1 to obtain biaxially oriented laminated films with an overall thickness of 0.5-10 μm. The parameters and properties of the films were determined as described above and the results are shown in Table 3 below. As can be seen from Table 3, the films of the present invention have excellent or good scratching resistance, dubbing resistance and friction coefficient, while with the films of the comparative examples, at least one of the three characteristics were not good.

TABLE 3

|  | Content of Particles in Layer A (wt %) | Thickness of Layer (μm) | Ratio of Average Particle Size/Thickness of Layer A |
|---|---|---|---|
| Example 15 | 30 | 3.0 | 0.5 |
| Example 16 | 35 | 3.0 | 0.93 |
| Example 17 | 30 | 3.0 | 1.7 |
| Example 18 | 25 | 0.5 | 5 |
| Comparative Example 8 | 6 | 3.0 | 0.08 |
| Comparative Example 9 | 25 | 0.5 | 12 |
| Comparative Example 10 | 0.05 | 5 | 0.06 |
| Comparative Example 11 | 0.05 | 6 | 0.05 |
| Comparative Example 12 | 0.05 | 5 | 0.1 |
| Comparative Example 13 | 0.15 | 10 | 0.05 |
| Comparative Example 14 | 0.5 | 8 | 0.1 |
| Comparative Example 15 | 0.5 | 10 | 0.1 |

TABLE 3-continued

| | Inert Particles | | Crystallization Index of Attenuated Total Reflection Raman | Scratch Resistance | Friction Coefficient (μk) |
|---|---|---|---|---|---|
| | Particle Size Ratio | Relative Standard Deviation | | | |
| Example 15 | 1.05 | 0.5 | 18 | good (3) | good 0.30 |
| Example 16 | 1.02 | 0.5 | 15 | good (3) | good 0.28 |
| Example 17 | 1.1 | 0.4 | 16 | good (3) | good 0.27 |
| Example 18 | 1.05 | 0.5 | 20 | good (4) | good 0.28 |
| Comparative Example 8 | 1.05 | 1.0 | 25 | not good (20) | not good 0.4 |
| Comparative Example 9 | 1.05 | 1.5 | 23 | not good (20) | not good 0.4 |
| Comparative Example 10 | 1.5 | 0.8 | 22 | not good (20) | not good 0.4 |
| Comparative Example 11 | 2.0 | 0.7 | 24 | not good (15) | not good 0.4 |
| Comparative Example 12 | 2.2 | 0.6 | 25 | not good (18) | not good 0.36 |
| Comparative Example 13 | 2.0 | 0.8 | 20 | not good (20) | not good 0.36 |
| Comparative Example 14 | 1.5 | 0.8 | 23 | not good (25) | not good 0.4 |
| Comparative Example 15 | 1.3 | 1.0 | 25 | not good (20) | not good 0.35 |

EXAMPLES 19-24

COMPARATIVE EXAMPLES 16 AND 17

PET, polyphenylene sulfide and nylon 6 were employed for preparing the thermoplastic resin A or B. An ethylene glycol slurry containing varied particles was heated at 190° C. for 1.5 hours and the solvent of the slurry was changed to water. The resulting slurry was mixed with a thermoplastic resin in a vented twin-screw extruder to prepare thermoplastic resin A containing prescribed amount of varied particles. The thermoplastic resin A was supplied to an extruder 1 and was melted at 310°-320° C. On the other hand, thermoplastic resin B which does not substantially contain particles was supplied to an extruder 2 and was melted at 290°-310° C. The thermoplastic resins A and B were combined as shown in Table 4, and were laminated as in Example 1 to prepare a three layered (A/B/A) non-oriented film. The ratio of the clearance of the slit of the die to the thickness of the non-oriented film was 10. The output of each extruder was controlled to control the overall thickness and the thickness of the thermoplastic resin layer A. The non-oriented film was stretched in the longitudinal direction with a stretching ratio of 4.3 times the original length at 50°-95° C. This stretching was conducted in four steps by using two pairs of rolls with different circumference velocities. Then the resulting uniaxially oriented film was stretched in the transverse direction with a stretching ratio of 4.0 times the original length in a stenter at a stretching rate of 2000%/min at 100° C. The resulting film was then heat-set at a constant length at 180° C. for 5 seconds to obtain biaxially oriented laminated films with an overall thickness of 15 μm, and with a varied thickness of the thermoplastic resin layer A, as well as varied ratios of the layer A thickness to average particle size of the particles and varied contents of the particles. The parameters of the films are shown in Table 4 below. As can be seen from Table 4 below, the films of the present invention have excellent or good scratching resistance, dubbing resistance and friction coefficient, while with the films of the comparative examples, at least one of the three characteristics were not good.

TABLE 4

| | Content of Particles in Layer A (wt %) | Thickness of Layer A (μm) | Ratio of Average Particle Size/ Thickness of Layer A | Thermoplastic Resin | |
|---|---|---|---|---|---|
| | | | | A | B |
| Example 19 | 10 | 0.15 | 2 | Polyethylene Terephthalate | Polyethylene Terephthalate |
| Example 20 | 15 | 0.1 | 3.3 | Polyethylene Terephthalate | Polyethylene Terephthalate |
| Example 21 | 10 | 0.15 | 2 | Nylon 6 | Nylon 6 |
| Example 22 | 10 | 0.15 | 2 | Polyethylene Sulfide | Polyethylene Terephthalate |
| Example 23 | 15 | 0.05 | 3 | Polyethylene Terephthalate | Polyethylene Terephthalate |
| Example 24 | 8 | 0.03 | 1.3 | Polyethylene Terephthalate | Polyethylene Terephthalate |
| Comparative Example 16 | 15 | 3 | 0.05 | Polyethylene Terephthalate | Polyethylene Terephthalate |
| Comparative Example 17 | 8 | 0.5 | 0.08 | Polyethylene Terephthalate | Polyethylene Terephthalate |

| | Parameter of Surface Roughness | | | Friction Coefficient (μk) | Scratch Resistance | Dubbing Resistance |
|---|---|---|---|---|---|---|
| | Rz/Rt | Sm (μm) | σ/H | | | |
| Example 19 | 0.9 | 5 | 0.6 | good 0.25 | excellent (1) | excellent (2.0 dB) |
| Example 20 | 0.9 | 4 | 0.6 | good 0.25 | excellent (1) | excellent (2.0 dB) |
| Example 21 | 0.85 | 5 | 0.5 | good 0.29 | good (1) | good (4.5 dB) |
| Example 22 | 0.9 | 5 | 0.6 | good 0.25 | good (5) | good (4.5 dB) |
| Example 23 | 0.95 | 4 | 0.4 | good 0.25 | excellent (0) | excellent (0.5 dB) |
| Example 24 | 0.9 | 6 | 0.6 | good 0.28 | excellent (1) | excellent (0.5 dB) |
| Comparative Example 16 | 0.7 | 10 | 0.9 | not good 0.36 | not good (22) | good (3.9 dB) |
| Comparative | 0.6 | 12 | 1.0 | not good 0.45 | not good (24) | good (3.8 dB) |

We claim:
1. A biaxially oriented laminated film comprising:
a first layer containing a first thermoplastic resin as a major constituent; and
a second layer containing a second thermoplastic resin comprising a crystalline polyester as a major constituent, which is formed on at least one surface of the first layer, the second layer containing inert particles with an average diameter of 0.5 to 5 times the thickness of the second layer, the content of the inert particles in the second layer being 0.5-50% by weight, the thickness of the second layer being 0.005-3 μm, and said crystalline polyester having a crystallization index of attenuated total reflection Raman of its surface which is up to but not more than 20 cm$^{-1}$.

2. The biaxially oriented laminated film of claim 1, wherein the second layer is formed on only one surface of the first layer.

3. The biaxially oriented laminated film of claim 1, wherein the second layer is formed on both surfaces of the first layer.

4. The biaxially oriented laminated film of claim 2, further comprising a third layer containing a third thermoplastic resin as a major constituent and inert particles on the surface of the first layer, which surface is opposite to the surface on which the second layer is formed.

5. The biaxially oriented laminated film of claim 1, wherein the first layer contains inert particles with an average diameter of 0.007-2 μm in the amount of 0.001-0.15% by weight with respect to the total weight of the first layer.

6. The biaxially oriented laminated film of claim 1, wherein the average height of protrusions on the surface of the second layer is not smaller than ⅓ of the average particle size of the inert particles in the second layer.

7. The biaxially oriented laminated film of claim 1, wherein the number of the protrusions on the surface of the second layer, of which height is smaller than ⅓ of the average diameter of the inert particles is not more than 40% of the total number of the protrusions.

8. The biaxially oriented laminated film of claim 1, wherein the depth (a) (nm) of the second layer from the surface thereof up to 3000 nm, at which the particle density is ten times that at the surface of the second layer, and the depth (b) (nm) at which the particle density is the same as that at the surface of the second layer satisfy the following relationships (i) and (ii):

$$10 \leq b - a \leq 1500 \quad (i)$$

$$5 \leq a \leq 500 \quad (ii)$$

9. The biaxially oriented laminated film of chain 1, wherein the average ratio of the shorter diameter of the particles to the longer diameter thereof is 1.0-1.3.

10. The biaxially oriented laminated film of claim 1, wherein the relative standard deviation of the inert particles contained in the second thermoplastic resin is not more than 0.6.

11. The biaxially oriented laminated film of claim 1, wherein the content Φ of the inert particles in the laminated film in terms of % by weight of the laminated film, the average diameter D (nm) of the inert particles, and the density of the total protrusions N (protrusions/mm$^2$) of at least one surface of the laminated film satisfy the following relationship (iii):

$$N/(\Phi/D^3) \geq 5 \times 10^{13} \quad (iii)$$

12. The biaxially oriented laminated film of claim 1, wherein a parameter of surface roughness Rt/Ra of at least one surface of the laminated film is not more than 8.0.

13. The biaxially oriented laminated film of claim 1, wherein a parameter of surface roughness Rz/Rt of at least one surface of the laminated film is not less than 0.85 and the interval between adjacent protrusions Sm thereof is not more than 6.0 μm.

14. The biaxially oriented laminated film of claim 1, wherein a parameter of surface roughness σ/H of at least one surface of the laminated film is not more than 0.8.

15. A laminated film roll comprising the biaxially oriented laminated film of any one of claims 1-14 in the form of a roll, the thickness fluctuation across the width of the roll being not more than 50% and the tightness of winding being 81-97.

16. A magnetic recording medium comprising the biaxially oriented laminated film of any one of claims 1-15, and a magnetic layer formed on at least one surface of the laminated film.

17. A thermal transfer material comprising the biaxially oriented laminated film of any one of claims 1-14, and a thermal transfer layer formed on at least one surface of the laminated film.

18. A biaxially oriented laminated film comprising:
a first layer containing a first thermoplastic resin as a major constituent; and
a second layer containing a second thermoplastic resin as a major constituent, which is formed on at least one surface of the first layer, the second layer containing inert particles with an average diameter of 0.1 to 10 times the thickness of the second layer, the content of theinert particles in the second layer being 0.5-50% by weight, the thickness of the second layer being 0.005-3 μm, wherein the average height of protrusions on the surface of the second layer is not smaller than ⅓ of the average particle size of the inert particles in the second layer.

* * * * *

UNITED STATES PATENT AND TRADEMARK OFFICE
CERTIFICATE OF CORRECTION

PATENT NO. : 5,069,962
DATED : December 3, 1991
INVENTOR(S) : Iwao Okazaki et al It is certified that error appears in the above-identified patent and that said Letters Patent is hereby corrected as shown below:

On the title page: after "[22] Filed: Jun. 8, 1989" insert
--[30] Foreign Application Priority Data
Jun. 8, 1988 [JP] Japan......63-141972
Dec. 12, 1988 [JP] Japan......63-314421--.

Column 4, line 5, "$\leqq a \leqq 500$" should read --$5 \leqq a \leqq 500$    (ii)--.

Column 11, line 14, please change "polar" to --polymer--.

Column 14, line 2, please change "A=B" to --A-B--.

Column 22, line 42, please change "1-15" to --1-14--.

Signed and Sealed this

Eighth Day of June, 1993

Attest:

MICHAEL K. KIRK

*Attesting Officer*    Acting Commissioner of Patents and Trademarks